July 16, 1929.  L. E. BARRINGER  1,721,367
TILE, STONEWARE ARTICLE AND THE LIKE
Filed Dec. 29, 1926
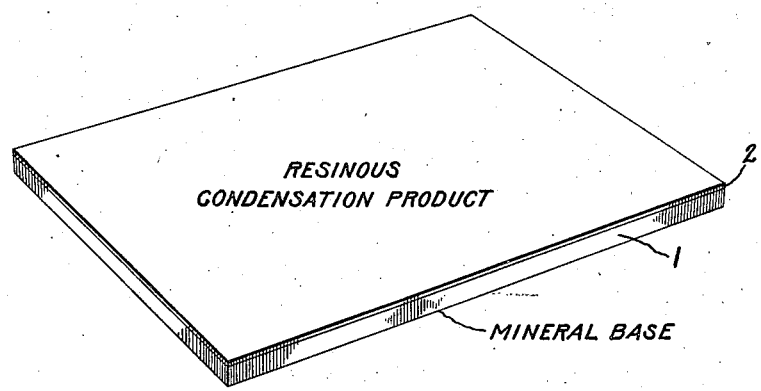
Inventor:
Lawrence E. Barringer,
by His Attorney.

Patented July 16, 1929.

1,721,367

UNITED STATES PATENT OFFICE.

LAWRENCE E. BARRINGER, OF SCHENECTADY, NEW YORK, ASSIGNOR TO GENERAL ELECTRIC COMPANY, A CORPORATION OF NEW YORK.

TILE, STONEWARE ARTICLE, AND THE LIKE.

Application filed December 29, 1926. Serial No. 157,809.

The present invention comprises a new form of shaped articles comprising mineral material which is coated with an organic enamel and a method of making such articles. Articles embodying my invention, although useful for building material and various other purposes, are adapted particularly well for the construction of food containers and refrigerators because of their imperviousness to liquids, low heat conductivity and complete absence of odor.

The shaped article embodying my invention comprises a body portion of shaped mineral material which preferably includes asbestos and a coating thereon of resin made from polyhydric alcohol and a polybasic acid, such as glycerol and phthalic anhydride.

The accompanying drawing shows in perspective a simple form of tile embodying my invention.

In carrying out my invention the body portion 1 of the article which may have various shapes (the drawing being merely illustrative) is formed by any known method. For example, I may employ the method described in my prior Patent 1,009,630 of November 21, 1911, to form a composition of asbestos bonded with a hydrous silicate of lime. This material is strong and rock-like and will permit heating to temperatures of several hundred degrees centigrade without deterioration. Molded articles constituted from asbestos bonded with a mineral binder, such as Portland cement or magnesium hydroxide, in the presence of water, can also be used. Likewise, the various compositions made by bonding mineral fillers of various kinds with water glass or other air-drying binders can be used for the purposes of my invention.

The mineral body, however made, is provided with a water-impervious, heat-resisting coating 2 of a resin or mixture of ester resins, made from a polyhydric alcohol and a polybasic acid (which I prefer to call alkyd resin) and being capable of becoming infusible and insoluble by heating. The resin made from glycerol and phthalic anhydride as described in United States Patents 1,108,329 and 1,108,330 granted to Michael Callahan on August 25, 1914, is an illustrative example of a resin of this class. The resin may be applied as a powder or by dipping, spraying or painting a solution or suspension of such a resin in the initial fusible, soluble stage, the resin preferably being admixed with a white or colored filler. The resin may be colored with a dye. For white coatings I prefer to add zinc oxide, tin oxide or one of the white pigments sold commercially as Albolith, Ponolith, lithopone, etc. Colored materials such as red iron oxide or green chromium oxide can be used.

When the resin is applied by sifting the powdered material upon the object to be coated, such object is heated to a temperature of about 200° C. Sometimes a priming coating of the clear resin, advantageously can be first applied followed by one or more coats of resin containing a filler or pigment.

The resin may be associated with various plasticizers, such as indene, indene polymer, diethyl phthalate, dibutyl phthalate, glycol diacetate, benzyl alcohol, benzyl benzoate, benzyl acetate, tricresyl phosphate, triacetin, anisol, o-cresyl benzoate, ethyl lactate and the like.

The coat or coatings of alkyd resin, whether applied in powdered solid form or in solution or suspension, are finally caused to coalesce and become converted to a hard, infusible, water-resisting condition by baking. For example, the coated article may be baked at a temperature of 150 to 200° C. for a sufficient length of time to convert the resin to the inert, horny condition,—say 10 to 12 hours. Sometimes it is advantageous to carry out the baking in two stages, first baking at 125 to 140° C. for about two hours and then baking at 200 to 220° C. for about two hours. When the coating is not sufficiently smooth it may be ground with a milling tool or abrasive wheel and then given a polish by buffing.

It has been found that coatings of alkyd resin adhere tenaciously to substances such as described and can not readily be removed as can ordinary paints, varnishes and lacquers by mechanical wear or by blows upon the surface nor do such coatings deteriorate upon long standing in any way as by loss of strength or change of color. The heat insulation value of mineral material so coated is materially improved by the presence of the enamel.

What I claim as new and desire to secure by Letters Patent of the United States, is:

1. An article of manufacture comprising a stony foundation material and an enamel thereon comprising an alkyd resin in an insoluble, infusible, condition, which is sufficiently adherent to such foundation material as to resist mechanical wear and blows, and is resistant to atmospheric deterioration.

2. A refrigerator lining comprising a stony asbestos composition provided with an enamel constituted of an infusible, insoluble compound of glycerine and phthalic anhydride and an opaque filler, said lining having a materially higher heat insulating value than a similar lining unassociated with said enamel.

In witness whereof I have hereunto set my hand this 28th day of December, 1926.

LAWRENCE E. BARRINGER.